United States Patent [19]

Spooner et al.

[11] Patent Number: 4,939,936
[45] Date of Patent: Jul. 10, 1990

[54] SHAPEMETER

[75] Inventors: Peter D. Spooner, Northwood; Colin A. Scottow, High Wycombe, both of Great Britain

[73] Assignee: Protos Precision Systems Limited, Watford, United Kingdom

[21] Appl. No.: 250,682

[22] PCT Filed: Mar. 25, 1987

[86] PCT No.: PCT/GB87/00206
§ 371 Date: Oct. 21, 1988
§ 102(e) Date: Oct. 21, 1988

[87] PCT Pub. No.: WO87/05837
PCT Pub. Date: Oct. 8, 1987

[30] Foreign Application Priority Data

Mar. 27, 1986 [GB] United Kingdom ............... 8607729

[51] Int. Cl.⁵ ........................... G01L 5/10; G01B 7/28
[52] U.S. Cl. ............................. 73/862.07; 73/862.48; 73/862.54
[58] Field of Search ............. 73/862.07, 862.48, 862.54

[56] References Cited

U.S. PATENT DOCUMENTS 3,413,846 12/1968 Flinth .
3,557,614 1/1971 Muhlberg .
4,112,751 9/1978 Grunbaum ................. 73/862.54
4,281,539 8/1981 Keller ......................... 73/862.54

FOREIGN PATENT DOCUMENTS 3009454 9/1981 Fed. Rep. of Germany ... 73/862.44
1160112 7/1969 United Kingdom .

Primary Examiner—Charles A. Ruehl
Attorney, Agent, or Firm—Fulbright & Jaworski

[57] ABSTRACT

A rotor module (2) for a shapemeter comprising a central arbor (7) to a non-rotatable ring (10) surrounding the arbor (7) by at least one web (9) and an outer cylinder (12) rotatable on bearings (13) on the ring (10) and means, (16, 17) carried by the arbor (7) to cooperate with the inner surface of the ring (10) to detect relative movements between the arbor and ring in response to a force applied to the cylinder (12) at a pre-determined position in order to provide output signals representative of such movements.

4 Claims, 2 Drawing Sheets

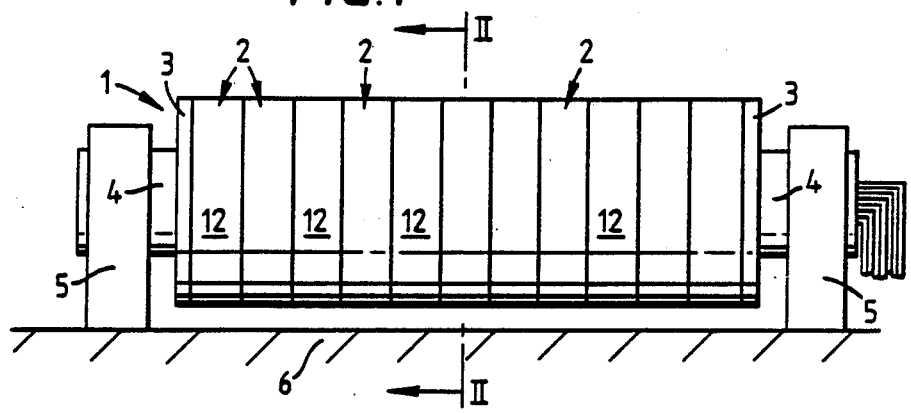
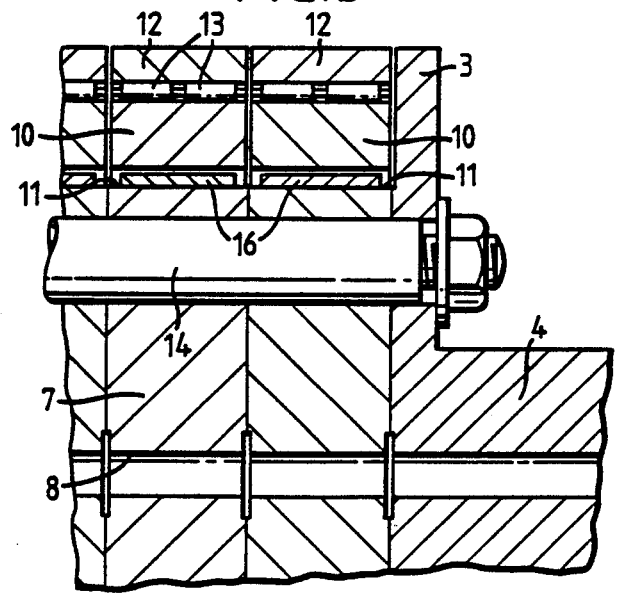

SHAPEMETER

This invention relates to a shapemeter for continuously detecting and indicating the shape of metallic strips during a rolling operation. The invention also provides a rotor module for such shapemeter.

In the rolling of metallic strip "shape" means a variation in width-wise tension when the strip is held in lengthwise tension. Thus "shape" refers to deviations of flatness of the strip in more than one direction. Poor flatness or "shape" results from imperfect rolling at an earlier stage and, unless remedial action is taken, is manifested in the finished product. By using a shapemeter lack of flatness may be detected and remedial action taken during the rolling operation.

A shapemeter usually has a number of concentric rotary sleeves arranged transversely to the passline of the strip and engaged under tension by the moving strip which is arranged to have a small "wrap" around the sleeves. Variations in shape are detected by sensing the load applied to individual sleeves, an instantaneous display of these individual loads indicating the flatness profile or shape of the strip then in contact with the shapemeter. Signals from the shapemeter representative of these individual loads may be used to control automatically the rolling operation, as by varying roll profile, or the degree and location of bad shape as indicated by the display may be interpreted to effect manual control of the rolling operation.

Numerous designs of shapemeters have been proposed in the past and some, such as that described in U.K. patent 1160112 are in successful use. In most earlier constructions the sleeves are carried on a mandrel and supported on air or roller bearings and the relative deflections of the sleeves are detected either by sensing changes in air pressure or by the use of other forms of load detector.

All existing shapemeters require very high tolerances to be maintained during construction resulting in very expensive instruments. Furthermore most current designs limit the minimum width to which a rotor can be manufactured thus limiting the number of rotors for a particular axial length of shapemeter and this, in turn, limits the resolution of measurement.

It is an object of the present invention to provide a shapemeter of simplified construction that does not require high tolerances during manufacture and that enables narrow rotors to be constructed. A further object is to provide an improved rotor module for such a shapemeter.

Our copending application No. PCT/GB87/00205, shows one design of rotor module and shapemeter; the present invention provides an alternative arrangement.

According to one aspect of the present invention there is provided a rotor module for a shapemeter comprising a central arbor secured to a non-rotatable ring surrounding the arbor and an outer hollow cylinder rotatable on bearings on the ring characterised in that the arbor is secured to the ring only by no more than two webs and means to detect relative movement between the arbor and the ring in response to a force applied to the cylinder at such a position as to cause the web or webs to bend in order to provide output signals representative of such movement. Preferably when there are two webs they are in substantial alignment. The means may be carried by the web so as directly to detect bending thereof in response to said movements.

Alternatively the means may detect a variation in a gap between the ring and the arbor at a location adjacent the predetermined position.

According to another aspect of the present invention there is provided a shapemeter comprising a plurality of rotor modules according to the preceding paragraph having their arbors joined together so that the cylinder of each module are concentric.

The above and other aspects of the present invention will now be described by way of example with reference to the accompanying drawings in which:

FIG. 1 is a side view of a shapemeter,

FIG. 3 is a part section on the line III—III of FIG. 2.

Figure 2:
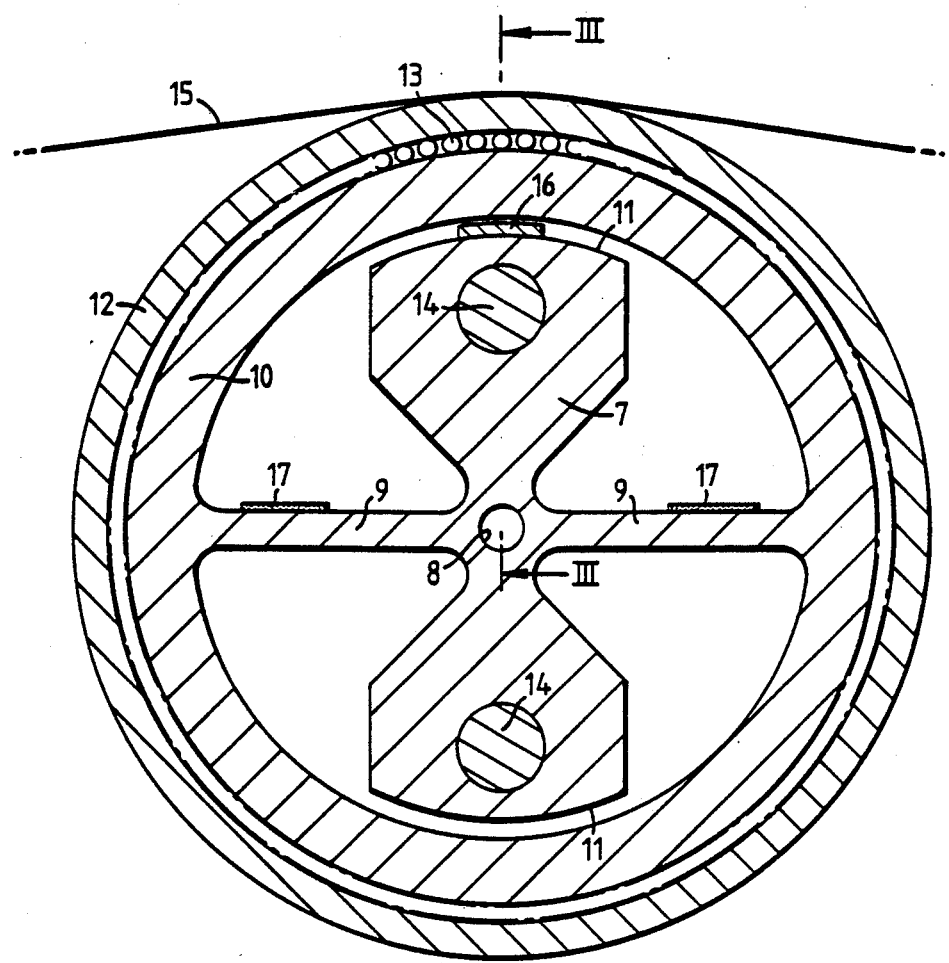
FIG. 2 is a section on the line II—II of FIG. 1 to a larger scale.

Referring to the drawings a shapemeter, indicated generally at 1, comprises a series of rotor modules 2 carried between end plates 3 having trunnions 4 carried by supports 5 on a carrier beam 6.

Each module 2 has a stationary arbor 7 of dumbell shape formed with a central bore 8, joined by opposed webs 9 to a non-rotatable ring 10 which is spaced from arcuate surfaces 11 on the arbor 7. An outer cylinder 12 is rotatable on roller bearings 13 carried by the ring 10.

A plurality of modules are joined axially by bolts 14 passing through the end plates 3, and the arbors 7, so that the assembly is rigidly mounted with each outer cylinder separately rotatable. It will here be understood that the axial lengths of each cylinder 12 are slightly less than the axial lengths of the arbors 7 so that the cylinders are freely rotatable.

As shown in FIG. 2 the shapemeter is mounted so that a rolled strip 15 passes under tension over the cylinders 12. Each cylinder is therefore subjected to a vertical load which causes the webs 9 to bend and narrows the gap between the inner surface of the ring 10 and the adjacent surface 11. This movement may be measured by sensors such as 16 carried by the arbor 7. The sensors may, for example, detect a change in capacitance between the inner surface of the cylinders 12 and the surface 11. Alternatively strain gauges 17 may be provided on the webs 9.

We claim:

1. A rotor module for a shapemeter comprising a central arbor secured to a non-rotatable ring surrounding the arbor and an outer hollow cylinder rotatable on bearings on the ring in which the arbor is secured to the ring solely by two webs which are in substantial alignment and means to detect relative movement between the arbor and the ring in response to a force applied to the cylinder at such a position as to cause the webs to bend in order to provide output signals representative of such movement and in which said means detects a variation in a gap between the ring and the arbor at a location adjacent said position.

2. A shapemeter comprising a plurality of rotor modules according to claim 1 having their arbors joined together so that the cylinders of each module are concentric.

3. A shapemeter comprising a plurality of rotor modules each comprising a central arbor secured to a non-rotatable ring surrounding the arbor in an outer hollow cylinder rotatable on bearings on the ring, the arbors being joined together so that their associated cylinders are concentric, in which each arbor is secured to its ring solely by two webs which are in substantial alignment and means are provided to detect relative movement between the arbor and the ring of each module in response to a force applied to the cylinder of that module at such a position as to cause the webs to bend in order to provide output signals representative to such movement.

4. A shapemeter according to claim 3 in which said means detects a variation in a gap between each ring and its associated arbor at a location adjacent said position.

* * * * *